(12) United States Patent
Deshusses (10) Patent No.: US 7,311,743 B2
(45) Date of Patent: Dec. 25, 2007

(54) BIOFILTRATION APPARATUS AND METHOD FOR REDUCING METHYL BROMIDE CONCENTRATION IN A VOLUME OF GAS

(75) Inventor: Marc A. Deshusses, Riverside, CA (US)

(73) Assignee: Energy Resource Institute, Inc., Riverside, CA (US)

( * ) Notice: Subject to any disclaimer, the term of this patent is extended or adjusted under 35 U.S.C. 154(b) by 444 days.

(21) Appl. No.: 11/015,263

(22) Filed: Dec. 16, 2004

(65) Prior Publication Data

US 2006/0134771 A1 Jun. 22, 2006

(51) Int. Cl.
*B01D 53/34* (2006.01)
(52) U.S. Cl. .............................. 55/392; 55/393; 55/494; 55/525; 422/122; 422/184; 435/266; 435/286.1; 435/286.5; 435/289.1; 435/294.1
(58) Field of Classification Search .................. 55/392, 55/393, 494, 525; 422/122, 184; 435/266, 435/286.1, 286.5, 289.1, 294.1
See application file for complete search history.

(56) References Cited

U.S. PATENT DOCUMENTS

| 4,662,900 A | 5/1987 | Ottengraf |
| 5,066,392 A | 11/1991 | Kneer |
| 5,505,908 A | 4/1996 | Nagji |
| 5,518,920 A | 5/1996 | Stewart et al. |

OTHER PUBLICATIONS

Gan et al., Recapturing and Decomposing Methyl Bromide in Fumigation Effluents, J. Haz. Mat. 57:249-258 (1998).
Yagi et al., 1993, Agricultural soil fumigation as a source of atmospheric methyl bromide, Proc. Natl. Acad. Sci. 90: 8420-8423.
Shorter et al., 1995, Rapid degradation of atmospheric methyl bromide in soils, Nature, 377:717-719.
Serça et al., 1998, Methyl bromide deposition to soils, Atmosph. Environ., 32:1581-1586.
Miller et al., 2003, Bioreactors for removing methyl bromide following contained fumigations, Environ. Sci. Technol., 37:1698-1704.

(Continued)

*Primary Examiner*—Duane Smith
*Assistant Examiner*—Minh-Chau T. Pham
(74) *Attorney, Agent, or Firm*—Stout, Uxa, Buyan & Mullins, LLP; Carlos A. Fisher (57) ABSTRACT

A biofiltration apparatus and method for reducing methyl bromide concentration in a volume of a gas are disclosed. The apparatus includes a housing and a substrate component located in the housing. The substrate component includes a population of methyl bromide degrading microorganisms. The housing receives a volume of contaminated gas, such as exhaust from a fumigation site, through a contaminated gas inlet. The contaminated gas is exposed to the methyl bromide degrading microorganisms where the methyl bromide is biodegraded. The filtered gas, or the gas with a reduced methyl bromide concentration, is then directed out of the housing. The apparatus may also include a contaminated gas load dampening device.

19 Claims, 7 Drawing Sheets

OTHER PUBLICATIONS

U.S.D.A., 1996, Recapturing methyl bromide emissions, Agricultural Research Service/vol. 2, No. 2/Apr. 1996, Web site http://www.ars.usda.gov/is/np/mba/april96/leesch.htm.

Chitwood and Deshusses, 2001, Development of a methyl bromide collection system for fumigated farmland. Environ. Sci. Technol. 35:636-642.

Weber et al., 1995, Use of activated carbon as a buffer in biofiltration of waste gases with fluctuating concentrations of toluene, Appl Microbiol Biotechnol, 43:365-369.

Leesch et al. (2000) Methyl bromide adsorption on activated carbon to control emissions from commodity fumigations. J. Stored Products Research 36:65-74.

Snyder and Leesch (2001) Methyl bromide recovery on activated carbon with repeated absorption and electrothermal regeneration. Ind. Eng. Chem. Res. 40:2925-2933.

Wonmer-Smith, et al., "Reduction of emissions of methyl bromide from chamber fumigations", International Pest Control, 1998, 14-20.

BIOFILTRATION APPARATUS AND METHOD FOR REDUCING METHYL BROMIDE CONCENTRATION IN A VOLUME OF GAS

FIELD OF THE INVENTION

The present invention relates generally to gas filtration systems and methods and more specifically the invention relates to a biofiltration apparatus and method for reducing methyl bromide concentration in a volume of gas.

BACKGROUND

Methyl bromide (bromomethane, MeBr, $CH_3Br$) is used as a fumigant to control pests and to protect agricultural commodities, among other things. For example, methyl bromide may be used as a fumigant on many products, including fruits, nuts, vegetables, plants, bulbs, seeds, cotton, tobacco, bailed hay, lumber, railroad cars, ships, and garbage. Soil or field (preplant) and quarantine (post-harvest) fumigations are the main sources of atmospheric methyl bromide emissions. Emissions from quarantine fumigations are typically highly discontinuous with a relatively small air stream containing an initially high, but exponentially declining methyl bromide concentration.

Unfortunately, methyl bromide has been shown to have a significant ozone depleting potential, being responsible for approximately 5-10% of the global ozone destruction, as well as being acutely toxic. Current fumigation procedures with methyl bromide do not prevent the escape of the methyl bromide. Food and structural fumigations directly emit methyl bromide into the atmosphere without any system of recovery and/or destruction of methyl bromide. In preplant or soil fumigations, greater than 80% of the applied methyl bromide dose escapes to the atmosphere (Yagi et al., 1993, Agricultural soil fumigation as a source of atmospheric methyl bromide, Proc. Natl. Acad. Sci. 90: 8420-8423), the rest being absorbed or degraded by the soil (Shorter et al., 1995, Rapid degradation of atmospheric methyl bromide in soils, Nature, 377:717-719; Serça et al., 1998, Methyl bromide deposition to soils, Atmosph. Environ., 32:1581-1586). The use of polyethylene (PE) tarps covering the soil during fumigation has little effect on controlling emissions because of the high diffusivity of methyl bromide through PE and its slow biotic and abiotic degradation rates in soils (Gan and Yates, 1998, Recapturing and decomposing methyl bromide in fumigation effluents, J. Hazardous Materials, 57:249-258; Yagi et al. supra).

Since fumigant alternatives to methyl bromide are still lacking, several techniques have been proposed over the past few years to treat or recycle methyl bromide contaminated air. These techniques include adsorption, chemical reaction in an aqueous phase, and thermal decomposition in a burner (Wontner-Smith et al., 1998, Reduction of emissions of methyl bromide from chamber fumigation, International Pest Control, January/February 1998, 14-18; Gan and Yates, supra; Nagji 1996, Recycling and recovery of methyl bromide fumigant, U.S. Pat. No. 5,505,908; U.S.D.A., 1996, Recapturing methyl bromide emissions, Agricultural Research Service/Vol. 2, No. 2/April 1996, Web site http://www.ars.usda.gov/is/np/mba/april96/leesch.htm). While adsorption either on activated carbon or on zeolites has shown some promise (Wontner-Smith et al., 1998, supra; Nagji 1996, supra), this process poses hazards as a result of the spent adsorbent, the high concentrations of methyl bromide sorbed involved, and uncontrolled release of the sorbed methyl bromide (Gan and Yates, 1998, supra). Also, it was noted that the adsorption capacity of activated carbons is often insufficient for adsorbing the high loads of methyl bromide vented from chamber fumigations resulting in only partial capture of methyl bromide (Wontner-Smith et al., 1998, supra). A major challenge for treatment of methyl bromide fumigations appears to be the relatively wide range of methyl bromide concentrations to be treated (0.02-45 $g/m^3$) and the discontinuous flow of the exhaust.

Thus, there remains a need for a system and method for treating methyl bromide emissions that is economical and environmentally friendly among other things.

SUMMARY

The present invention attempts to address this need. A biotreatment or biofiltration apparatus is disclosed that is configured to reduce methyl bromide concentrations present in a volume of gas, such as air. The system and method disclosed herein provides an economical environmentally-friendly treatment of methyl bromide emissions. The system and method may also offer effective treatment for a variety of applications, ranging from odor control to treatment of halogenated volatiles such as methylene chloride. In accordance with the disclosure herein, methyl bromide is converted to non-toxic, natural end-products at relatively low temperatures. In addition, because of the low operating temperatures, biotreatment results in no formation of nitrogen oxides (NOx), spent activated carbon, or other noxious by-products.

The filtration apparatus and the method disclosed herein can be utilized for reducing methyl bromide concentrations in a volume of gas containing methyl bromide, such as the exhaust gas from soil after proper capture or commodity fumigations.

In one embodiment, a methyl bromide filtration apparatus comprises or includes a housing, a contaminated gas inlet and a filtered gas outlet located on the housing, and a substrate component that includes a population of methyl bromide-degrading microorganisms. The microorganisms may be one or more strains of methyl bromide-degrading bacteria, one or more strains of methyl bromide-degrading fungi, or combinations thereof. The substrate component is typically provided between the contaminated gas inlet and the filtered gas outlet so that the contaminated gas passes through the substrate component, where the gas is filtered, to the filtered gas outlet. In other words, the contaminated gas inlet and the filtered gas outlet are typically provided on opposite sides of the substrate component. The substrate component of the filtration apparatus includes one or more sections of a porous material that is effective in promoting growth of the microorganisms thereon. In at least one embodiment, the microorganisms form a film on the substrate component. The microorganisms may receive a source of nutrients in addition to the methyl bromide-containing gas. The microorganisms degrade the methyl bromide from the gas into non-toxic products. Thus, the system disclosed herein may include a biotrickling filter or biotrickling filtration apparatus comprising one or more populations of methyl bromide-degrading bacteria.

A method of filtering methyl bromide from a volume of gas, such as air, includes providing a biofiltration apparatus having a population of methyl bromide-degrading microorganisms, such as bacteria or fungi, provided with a substrate component located in a housing. Contaminated gas containing methyl bromide is then directed into the housing via a contaminated gas inlet. The methyl bromide-degrading microorganisms are exposed to the contaminated gas at a rate that enables the microorganisms to degrade the methyl bromide from the gas into component elements. The resulting filtered gas is then directed out from the housing through a filtered gas outlet. The method may also include at least one step of providing a nutrient liquid to the microorganisms, recycling the liquid in the filtration apparatus, and controlling the conditions of the liquid to effectively control the growth and activity of the microorganisms.

In another aspect of the invention disclosed herein, a population of methyl bromide degrading bacteria are obtained by a process comprising providing a contained environment having a substrate component structured to permit bacteria to grow thereon; placing a naturally occurring sedimentatious material, such as soil, sewage, sediment, and the like, suspected of containing methyl bromide-degrading bacteria in the contained environment; and exposing the contained environment to a substantially continuous supply of gas containing a low concentration of methyl bromide. The methyl bromide-degrading bacteria are exposed to the methyl bromide-containing gas and degrade the methyl bromide into non-toxic components. The biomass accumulation rate, such as the bacterial growth rate, may be controlled by varying the pH of a nutrient solution, altering the temperature of the contained environment, or controlling the amount of methyl bromide to which the bacteria are exposed.

The invention may also include or utilize a contaminated gas load dampening device that is coupled to the filtration apparatus to reduce surges or spikes in the contaminated gas entering the housing. The load dampening device may include a solid phase or a liquid phase. For example, the load dampening device may include granulated activated carbon, or an organic liquid. The load dampening device is configured to absorb peak high concentrations of methyl bromide in the contaminated gas and to release methyl bromide when the concentration of methyl bromide lessens. Thus, the load dampening device helps maintain a relatively even methyl bromide concentration range in a volume of gas entering the filtration apparatus.

In addition, any feature or combination of features described herein are included within the scope of the present invention provided that the features included in any such combination are not mutually inconsistent as will be apparent from the context, this specification, and the knowledge of one of ordinary skill in the art. Also, any feature or combination of features may be specifically excluded from any embodiment of the present invention. Additional advantages and aspects of the present invention are apparent in the following detailed description, drawings, and claims.

DETAILED DESCRIPTION

Generally, a biofiltration apparatus is disclosed which is effective in filtering methyl bromide from a volume of methyl bromide-containing gas, such as a volume of air that contains methyl bromide. Typically, the volume of gas will be from an exhaust of a methyl bromide fumigation site, such as a field fumigation site or a quarantine fumigation site. The filtration apparatus disclosed herein is illustrated as including a biotrickling filter. In other words, the filtration apparatus includes a biological reactor where polluted gas, such as air containing methyl bromide, can be biologically treated by contacting a volume of the polluted gas with a scrubbing solution, such as water, in a column containing a substrate that includes a population of methyl-bromide degrading microorganisms, such as bacteria or fungi. In the illustrated system disclosed herein, the methyl-bromide degrading microorganisms refer to organisms that can degrade methyl-bromide, and include without limitation, organisms such as bacteria and fungi. The filtration apparatus disclosed herein provides for nearly simultaneous absorption and biodegradation of methyl bromide.

Typically, in biotrickling filters, pollutants are used by microorganisms as carbon and energy sources and the general degradation reaction can be written as Equation 1, indicated below.

Equation 1

Organic pollutant + Oxygen $\xrightarrow{\text{microorganisms}}$ $CO_2$ + $H_2O$ + Biomass For organic pollutants containing Cl, Br, or S, additional oxidation end-products include chloride, bromide or sulfate ions, respectively. Equation 2 shows the reaction for methyl bromide elimination.

Equation 2

$CH_3Br$ + Oxygen $\xrightarrow{\text{microorganisms}}$ $CO_2$ + $H_2O$ + $Br^-$ + Biomass Contaminated air, such as air containing a fumigant, is contacted with an aqueous scrubbing solution as it enters into a packed tower or a housing containing a packing material. Within the packing material, pollutant degrading micro-organisms are naturally immobilized. The microorganisms grow to form a film, such as a thick biofilm, in which the absorbed pollutant is biodegraded. The trickling liquid provides one example of a means to control pH, salinity, temperature and nutrients (mineral salts). New biomass (e.g., bacteria) is formed on the packing medium and is continuously washed out due to hydraulic shear from the nutrient liquid flowing through the packing material. The end-products of biodegradation are carbon dioxide and water, and in the case of methyl bromide elimination, bromide ions will also be released in the liquid. The purge water or liquid can be readily disposed since it is not hazardous. Relevant liquid phase parameters (pH, temperature, nutrients, ionic strength) can be controlled in the liquid collected at bottom of the column or housing.

Figure 4:
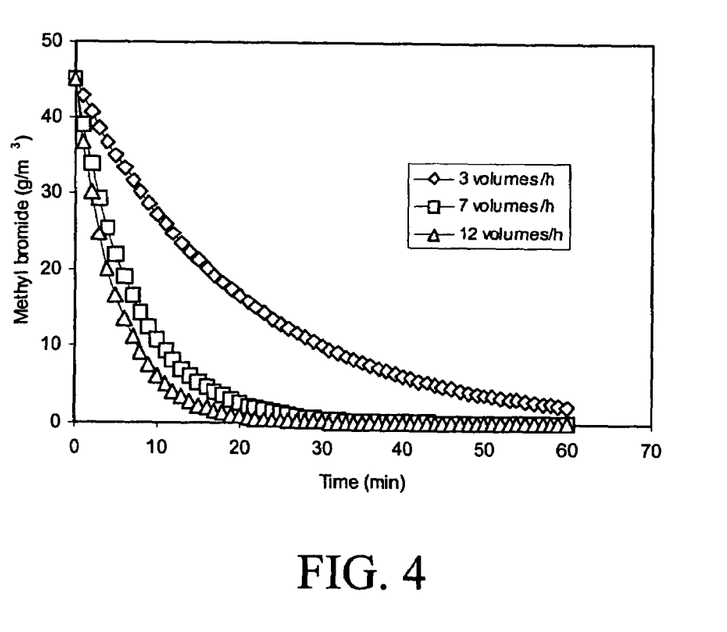
FIG. 4 is a graph of methyl bromide emissions in the exhaust of a fumigation chamber plotted as a function of air exchange rate.

In existing fumigation systems, ventilation after fumigation is generally done by suction fans and exhaust ducts. In most cases, ventilation is continued down to a methyl bromide concentration of 5 ppm, although passive aeration is sometimes allowed when the concentration is less than 100 ppm. As shown in FIG. 4, an air exchange rate (F/V) of approximately 7 volumes/h would be required to reduce the methyl bromide concentration from initially 45 g/m³ down to 0.02 g/m³ in one hour. The maximum size of fumigation chambers is about 80 m³, as recommended by Bond (1989), which is also the largest size commercially available (Vacudyne, Inc., Chicago, Ill.). This size of chamber generates an air flow rate of about 560 m³/h.

In the illustrated embodiment, the filtration apparatus comprises a housing having a contaminated gas inlet and a filtered gas outlet, and a substrate component that includes a population of methyl bromide-degrading microorganisms. The housing of the filtration apparatus may be fixed or mobile. In certain embodiments, the housing and additional components of the filtration apparatus are made of relatively light weight materials which enables the apparatus to be moved on a trailer or other similar mobile device.

Figure 1:
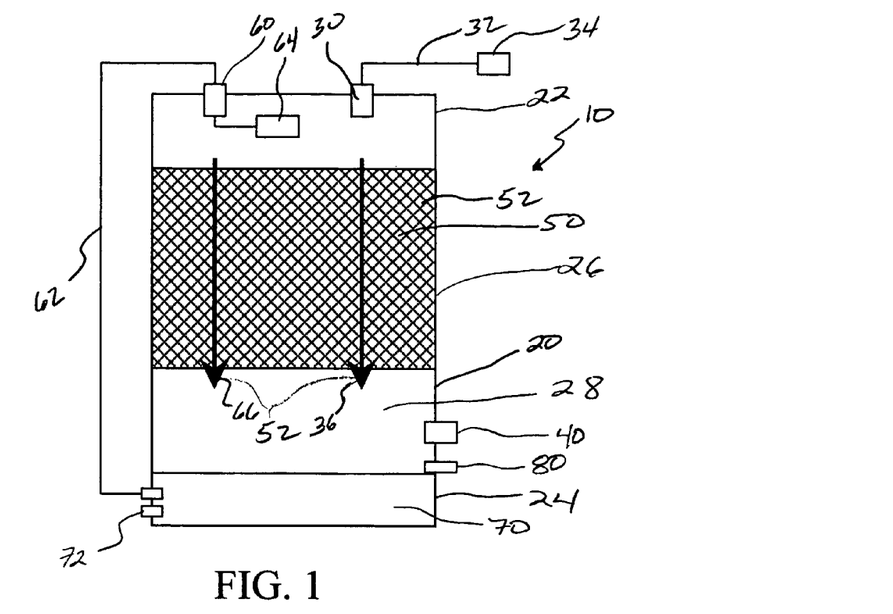
FIG. 1 is an illustration of a methyl bromide filtration apparatus including a single substrate component, as disclosed herein.

In reference to the figures, FIG. 1 illustrates a filtration apparatus 10 that includes a housing 20. The housing 20 has a first end 22, a second end 24, and a sidewall 26 extending from the first end 22 to the second end 24. The components of the housing thereby define an interior compartment 28. The apparatus 10 also includes a contaminated gas inlet 30, which is located on the housing 20 to direct methyl bromide-containing gas into the interior compartment 28. A filtered gas outlet 40 is also located on the housing 20 to direct filtered gas, such as gas that has reduced amounts of methyl bromide, from the interior compartment. A substrate component 50 is located in the housing interior compartment 28. The substrate component 50 includes a population of methyl bromide-degrading microorganisms.

The housing 20 may include one or more sidewalls 26. In the illustrated embodiment, the housing 20 includes one sidewall 26. In this embodiment, the housing has a generally cylindrical structure, with a substantially circular cross-section. In embodiments of the housing 20 that include one or more straight or flat sidewalls 26, the housing may have a non-circular cross section. The housing 20 may be made of any suitable material, such as plastic, including polyethylene and polyvinyl chloride plastics, or steel, fiberglass, or concrete. The size of the housing may vary depending on the volume of gas being treated. In certain embodiments, the housing 20 has an inner diameter of approximately five feet and a height of approximately 10 feet. Smaller or larger size housings may be used in other embodiments. Housings with these dimensions may provide a bed volume of about 3 m³ capable of treating medium fumigation chamber exhausts, for example up to about 65 m³ chamber volume. The housing 20 is generally fluid tight, or in other words, the housing 20 does not permit gas or liquid to escape therefrom except for the specified inlets and outlets described herein. Thus, the components of the filtration apparatus may be coupled to the housing using conventional methods and devices to obtain the fluid-tight properties of the housing 20.

Figure 2:
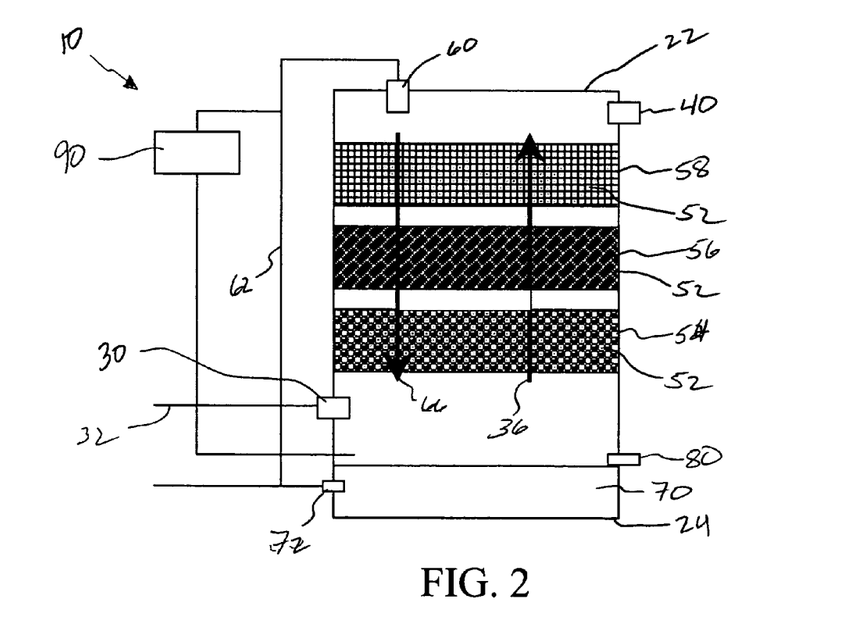
FIG. 2 is an illustration of a methyl bromide filtration apparatus including a substrate component having three sections.
Figure 3:
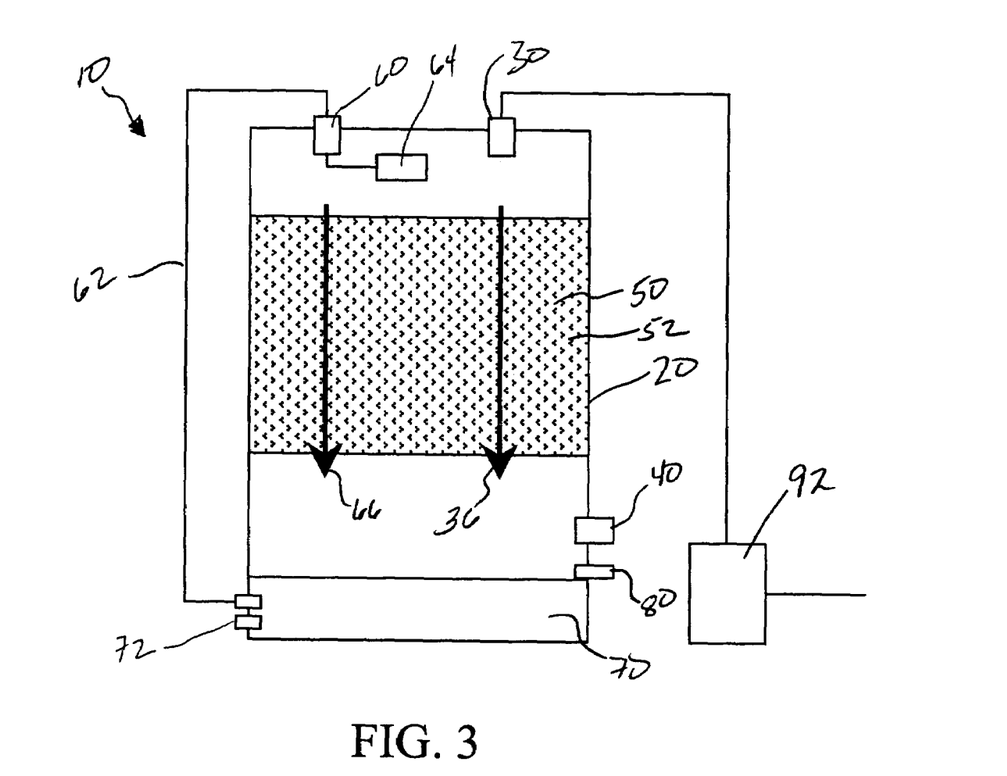
FIG. 3 is an illustration of a methyl bromide filtration apparatus including a load dampening device.

In the embodiment illustrated in FIG. 1, the contaminated gas inlet 30 is located on the first end 22 of the housing 20. For example, as shown in FIG. 1, the contaminated gas inlet may be located at the top of the housing 20. However, as shown in FIG. 2, the contaminated gas inlet 30 may also be located closer to the second end 24 of the housing 20. The position of the contaminated gas inlet 30 will vary depending on the configuration of the apparatus 10, and as described herein. The contaminated gas inlet 30 is preferably coupled to a source of contaminated gas 34, such as a contaminated gas blower. The contaminated gas may be directed along a contaminated gas conduit 32 so that the contaminated gas is directed from the contaminated gas inlet 30 into the housing 20. The conduit 32 and/or the contaminated gas inlet 30 may be made of any suitable material, including plastics, such as polyvinylchloride tubing, fiberglass, steel and the like.

Referring back to FIG. 1, the filtered gas outlet 40 may be located closer to the second end 24 of the housing 20 compared to the first end 22. But, as shown in FIG. 2, the filtered gas outlet 40 may also be located closer to the first end 22 depending on the configuration of the apparatus 10. Typically, the contaminated gas inlet 30 and the filtered gas outlet 40 are located on opposite sides or opposite ends of the substrate component 50. Thus, a contaminated gas flow path 36 is generally illustrated as being directed from the contaminated gas inlet 30 towards the filtered gas outlet 40. Similar to the contaminated gas inlet components, the filtered gas outlet 40 may be coupled to a conduit or other similar flow direction device to deliver the filtered gas from the filtration apparatus 10. Thus, it may be understood that that substrate component 50 is located downstream of the contaminated gas inlet 30 and upstream of the filtered gas outlet 40. As discussed herein, the gas may flow in an upward direction or in a downward direction, or even horizontally. Liquid my flow in the same or different direction than the gas, for example, the liquid may flow in a downward direction and the gas may flow horizontally.

The apparatus 10 disclosed herein includes a substrate component 50 that comprises, consists essentially of, or consists of, a non-liquid material. As shown in FIG. 1, the substrate component 50 includes a plurality of fluid flow paths, generally shown at 52. The flow paths 52 are defined as paths or openings that are present in the substrate component 50. The flow paths 52 permit both gases and liquids to flow through the substrate component 50.

As shown in FIG. 1, the gas flow arrow 36 is cocurrent (air down-flow) with the nutrient flow path 66. As shown in FIG. 2, the arrow 36 is countercurrent (air up-flow) relative to the arrow 66. In other embodiments, the flow may be cross-current, as discussed herein. The flow paths 52 permit the methyl bromide-contaminated gas to flow through the substrate component 50. Depending on the material used in the substrate component 50, the fluid flow paths 52 may be randomly arranged or non-randomly arranged. For example, when the substrate component 50 is formed from a packing material, as discussed herein, flow paths 52 may be formed between individual pieces of the packing material, as well as through the individual pieces of the packing material, such as pores provided in the packing material pieces.

The substrate component 50 may be provided as one or more sections within the housing 20. For example, as shown in FIG. 1, the substrate component 50 is illustrated as one section. However, as shown in FIG. 2, the substrate component 50 is illustrated as three sections, and in particular, a first substrate section 54, a second substrate section 56, and a third substrate section 58. When more than one substrate section is provided, the sections may contact each other or may be spaced apart, as illustrated in FIG. 2.

The substrate component 50 includes a population of microorganisms that degrade methyl bromide. In other words, the microorganisms may be bacteria or fungi that utilize methyl bromide an energy source. The substrate component 50 may include one or more strains of methyl bromide-degrading microorganisms. Currently, at least nine strains of methyl bromide-degrading bacteria have been isolated. Thus, in certain embodiments, the substrate component 50 may include one or more of these nine strains of bacteria.

The microorganisms are provided on the substrate component 50 so that the microorganisms are exposed to the contaminated gas that passes from the contaminated gas inlet 30. As the methyl bromide-containing gas passes over the microorganisms, the microorganisms can use the methyl bromide in the gas as carbon and energy source, and can aerobically degrade the methyl bromide into products with reduced or no toxicity. Typically, the microorganisms are provided as a biofilm on or over the substrate component 50.

Figure 11:
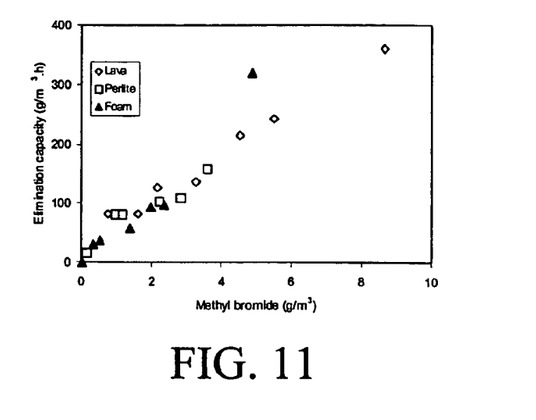
FIG. 11 is a graph of methyl bromide elimination capacity as a function of methyl bromide density in three different substrate sections.

The substrate component 50 thus includes a material, such as a packing material, that promotes effective colonization and growth of microorganisms. Some examples of materials that are useful in the apparatus 10 include plastic material (Rashig or Pall rings, balls etc.), lava rock, open pore foam, PERLITE, polyurethane, granular activated carbon, or other inorganic support material. Elimination capacities of different packing material are shown in FIG. 11. No significant differences were observed in the performance of each packing, although their characteristics differ widely. The material of the substrate component is preferably inert. When multiple sections of the substrate component 50 are utilized, as shown in FIG. 2, each section may include a different substrate material. For example, the first section 54 may include PERLITE, the second section 56 may include lava rock, and the third section 58 may include open pore foam. Or, the first section and third section may include PERLITE, and the second section may include lava rock. When the housing 20 is a mobile device, it may be desirable to utilize packing material that is relatively light weight compared to other types of packing material.

As shown in FIG. 1 and FIG. 2, the apparatus 10 may also include, and preferably does include, a microbe nutrient inlet 60 located on the housing 20. In FIG. 1 and FIG. 2, the microbe nutrient inlet 60 is located at the first end 22 of the housing 20. In reference to the embodiment illustrated in the accompanying drawings, because the first end 22 is located at the top of the housing 20, the microbe nutrient inlet 60 is located near the top of the housing 20 so that a nutrient liquid may be delivered to the microorganisms by relying on gravity. However, in additional embodiments or configurations, the nutrient inlet 60 may be provided on other regions of the housing 20. The apparatus 10 may also include a nutrient dispersion device 64 coupled to the microbe nutrient inlet 60 so that nutrients may be directed from the microbe nutrient inlet 60 to the nutrient dispersion device 64. The nutrient dispersion device 64 may be structured to disperse a nutrient containing liquid over substantially all of a surface of the substrate, such as the upper or top surface of the substrate component 50 illustrated in FIG. 1. Due to gravitational forces, the nutrient liquid will flow through the substrate component as indicated by arrow 66. The nutrient dispersion device 64 may include one or more nozzles which are structured to spray a liquid therefrom. The microbe nutrient inlet 60 is illustrated as being coupled to a nutrient reservoir component 70 by way of a microbe nutrient inlet conduit 62. The nutrient liquid may be any appropriate physiological liquid known to persons of ordinary skill in the art.

In the illustrated embodiment, the nutrient reservoir component 70 is located in the housing 20, for example, at the second end 24 of the housing. In additional embodiments, a nutrient reservoir component can be located outside of the housing 20. Furthermore, the apparatus 10 may include a nutrient feed line 72 which is positioned to provide fluid communication between a nutrient source and the nutrient reservoir component 70. The nutrient inlet 60 and the nutrient feed line 72 may be made of any suitable material, including plastics, such as polyvinyl chloride and the like. As illustrated, the nutrient inlet 60 is coupled to the nutrient reservoir component 70 to receive a liquid nutrient from the nutrient reservoir component. This liquid may be passed over the substrate component 50 to feed the microorganisms of the substrate component 50 and then collected in the nutrient reservoir component 70. Thus, the liquid may be referred to as a recycle liquid. The flow rate and the composition of the material flowing through the feed line 72 can be controlled or adjusted to control the concentration of sodium bromide (NaBr) in the recycle liquid of the apparatus. For example, the liquid feed rate can be controlled to raise or lower the concentration of NaBr in the recycle liquid. If desired, on-line monitoring is possible by conductivity measurements, for example, in the recycle liquid as the conductivity is directly related to the NaBr concentration (see FIG. 9, for example).

The apparatus 10 shown in FIG. 1 and FIG. 2 may also include a liquid outlet 80 located in proximity to the nutrient reservoir component 70. The liquid outlet 80 is positioned in the housing to reduce the potential for overflow of the liquid contained in the nutrient reservoir component 70. Typically, the liquid outlet 80 is coupled to a waste or drain where the overflow can be discharged or removed from the housing 20.

Figure 19:
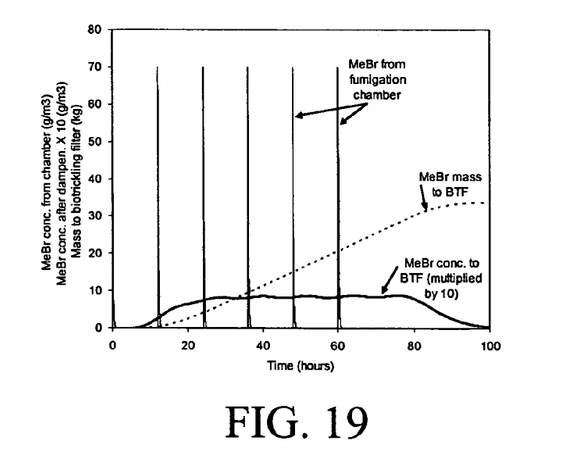
FIG. 19 is a graph of methyl bromide concentration from the chamber, methyl bromide concentration after dampening (×10), and mass of the biotrickling filter versus time.

As shown in FIG. 2, the apparatus 10 may also include a controller device 90 that is coupled to the apparatus 10 to control the flow of contaminated gas through the apparatus. Examples of controller devices used with apparatus 10 include dampers, gates and other controllers known to persons of ordinary skill in the art. The controller device 90 may also include a pH controller that is effective to control the pH of the nutrient fluid flowing through the microbe nutrient inlet conduit 62, although the pH controller may also be a separate component of the filtration apparatus. Any conventional pH controller may be used as understood by persons of ordinary skill in the art. Preferably, the pH controller includes a pH control unit, a storage vessel, and a metering system for supplying caustic soda or other pH adjusting material. These or other controllers may also be able to monitor and/or control features, such as a water level, water flow rate, and nutrient concentrations, among other things. Thus, a biofiltration apparatus may also include high or low water level shut-down control device, a pH control device, and a water and nutrient feed control. These control elements may be manually controlled and monitored, or may be controlled and monitored by a computer. The control and monitoring may be performed on-site, such as at the treatment site, or remotely, such as at a centralized control station.

The apparatus 10 may also include a contaminated gas load dampening device 92, as shown in FIG. 3. The load dampening device 92 is structured to be effective in reducing surges or spikes of contaminated gas entering the housing 20 through the contaminated gas inlet 30. The load dampening device 92 may be understood to be an adsorption/absorption pre-conditioning system which configured to equalize the load in the apparatus 10. An important function of the pre-conditioning or load-dampening system is to absorb methyl bromide from the air stream when the methyl bromide concentration is high, and release methyl bromide when the gaseous concentration of methyl bromide is low.

Thus, concentration peaks may be attenuated and the concentration of methyl bromide may be dispersed or spread by using a load-dampening system or load-dampening device 92. Such a system or device may be placed upstream of the biotrickling filter to absorb excess peaks of methyl bromide before the methyl bromide is passed to the microorganisms of the substrate component 50. The load-dampening device 92 should release the methyl bromide during low concentration periods.

In one embodiment, the apparatus 10 includes a load dampening device 92 containing granular activated carbon (GAC). The GAC may be obtained from coconut shell. In another embodiment, the load dampening device 92 may include any other solid adsorbent, such as zeolite, or other material with suitable adsorption characteristics for methyl bromide, such as characteristics similar to GAC adsorption characteristics. One example of a load dampening device 92 utilizing GAC in the apparatus 10 may be based on the design disclosed by Weber and Harmans (1992) Biological waste gas treatment with integrated absorption for the treatment of fluctuating concentrations. In: Biotechniques for air pollution abatement and odour control policies, Dragt, A. J., Van Ham, J. (eds), Elsevier, Amsterdam, pp. 125-130,. Additional tools may be used, as necessary, as disclosed by Leesch et al. ((2000) Methyl bromide adsorption on activated carbon to control emissions from commodity fumigations. J. Stored Products Research 36:65-74, and Snyder and Leesch (2001) Methyl bromide recovery on activated carbon with repeated absorption and electrothermal regeneration. Ind. Eng. Chem. Res. 40:2925-2933).

In one embodiment of the apparatus 10, the equipment will include a simple canister filled with GAC (for example, about 100-400 kg for daily treatment of 5 kg methyl bromide), which will serve for passive adsorption/desorption (see FIG. 19). This setup may allow for re-use of the activated carbon for multiple cycles, such as hundreds of cycles. A determination of the required mass of GAC for a particular treatment system or site will be based on adsorption isotherms with methyl bromide, and selected breakthrough/desorption curves with methyl bromide in air. Such calculations are made without undue experimentation. The GAC may be a coconut shell GAC in a 4 cm inner diameter, 1 m high column.

In another embodiment, a gas/liquid absorber may be provided in the load dampening device 92. The liquid may be provided in a closed loop and is effective as a load dampening system. Since methyl bromide is only moderately water soluble, an organic or mineral liquid may be used. Such liquid may increase the rate of methyl bromide absorption, and it may also provide additional absorption capacity in the liquid until desorption occurs when the gas phase concentration drops to below the corresponding equilibrium concentration of methyl bromide in the organic liquid.

In selecting a suitable liquid absorber, an organic or mineral liquid should be chosen to have a low gas/liquid partition for methyl bromide, preferably below 0.01 (gas over liquid concentration, when calculated in mass concentrations). The organic liquid should also be non-volatile, and non-biodegradable. The organic liquid should be non-toxic (in case of small carry over to the biotrickling filter) and should preferably be non-miscible with water and compatible with usual materials used for reactor construction. Some suitable organic liquids may include dodecanoic acid and undecanone. Others may include oils, such as corn oil.

If necessary, the air/organic phase partition coefficients of methyl bromide in these and other potential organic liquids may be determined by adding a known amount of an organic liquid and methyl bromide to a 250 mL flask with TEFLON-lined silicon septa. A gas headspace may be analyzed for methyl bromide by gas chromatography, and the partition of methyl bromide may be calculated. In certain embodiments, corn oil may be preferred since the air/corn oil partition coefficient for methyl bromide is 0.02, i.e., about ten times lower than with water. Based on calculations, a Henry coefficient of 0.005 may be ideal for load dampening. The organic phase should meet various requirements, such as a low vapor pressure, low toxicity, non-miscibility with water, and being non-biodegradable. Additional examples of liquids may include di-n-octylphtalate, di-n-nonylphtalate, polydimethylsiloxane, and silicone oil. Methyl bromide concentrations in the inlet and outlet air may be determined (continuously or semi-continuously) with a photoionization detector (PID) analyzer, for example. A sample dilution system may be included to improve the accuracy of the measurement of methyl bromide concentrations exceeding the concentration range of the PID (e.g., 0.1-3000 ppm). Potential carry over of aerosol to the outlet stream may be determined to evaluate whether a demister might be beneficial. For either the GAC or liquid absorption system, the results may be analyzed with mathematical model (see FIG. 19).

As indicated herein, the system may be substantially fixed or mobile. For example, the filtration apparatus may be provided on a mobile base, such as a trailer, and the like, or may be provided on a substantially fixed base. The system disclosed herein may also include all the necessary ancillary equipment associated with biotrickling filters, such as one or more pumps, one or more blowers, one or more nutrient containers, and the like. In certain embodiments, especially mobile embodiments, the components of the filtration apparatus should be universally configured so that the system can be assembled easily and rapidly. This may be referred to as a "plug and play" type of system.

In one embodiment, the microorganisms of the apparatus 10 convert approximately 100% of the methyl bromide to carbon dioxide and bromide ions. In addition, little, if any, bromate is formed during the biodegradation. Microorganisms, including bacteria and/or fungi, of a particular apparatus 10 may be selected based on microbiological and kinetic parameters. For example, inhibition kinetics of methyl bromide degradation by the microorganisms at high concentrations in air may be used as a selection criteria. Typically, concentration tolerant species may be preferred for inoculation into systems subject to high concentrations of methyl bromide. Biodegradation rates at low (0-2.5 $g/m^3$ in air) methyl bromide concentrations may be used to select certain species. For example, species with low half saturation constants may be selected for inoculation into systems treating low concentrations of methyl bromide. Expression of methyl bromide degradation may be a selection criteria, such as whether the microorganisms constitutively degrade methyl bromide or whether they require induction. Substrate preferences may be used to select microorganisms that grow rapidly on certain substrates, such as PERLITE. Requirements of the microorganisms for minerals, trace-elements and vitamins as nutrients for growth and maximum activity may also be used to select the desired microorganisms. Identification of the species and evaluation of their potential opportunistic pathogenicity. These and other selection criteria may be employed without undue experimentation.

As one example, standard microbiological techniques may be used to evaluate biokinetic parameters. Experiments can be performed in 250 mL EPA shake flasks equipped with Mininert TEFLON valves to prevent escape of methyl bromide. A mineral medium volume of about 50-100 mL may be used to ensure sufficient oxygen supply via the headspace. The flasks can be inoculated with stock cultures of methyl bromide degrading microorganisms, and methyl bromide gas can be injected into the headspace. Headspace concentrations of methyl bromide may be monitored by injection of small samples into a gas chromatograph, and the production of bromide ion in the recycle liquid may be analyzed using a bromide ion selective electrode. Biomass growth may be followed by determination of appropriate parameters, such as dry biomass weight, optical density and/or protein concentration, and may be used to compare the specific methyl bromide degradation rates of the species under an array of selected conditions. A factorial approach may also be used to minimize the number of experiments. The results of biodegradation tests may be compared to controls (e.g., without methyl bromide, or without inoculation, or standard conditions).

In order to determine whether the enzymes responsible for methyl bromide degradation are constitutive, a substantially pure species of microorganisms may be grown on a rich medium with glucose as a sole carbon and energy source. The ability of the cultures to degrade methyl bromide may be tested after 1 and 3 sub-transfers. In the case methyl bromide degradation activity is lost, the induction time may be determined by adding methyl bromide and following the lag phase for degradation. If the degradation activity is permanently lost, alternate growth substrates can be screened, in an attempt to find a substance other than methyl bromide for growing effective methyl bromide degraders without losing activity. Methanol, methane, methyl chloride, and methylene chloride can be among the substances tested.

Further identification of the methyl bromide degrading microorganisms may be accomplished using 16S rDNA sequencing in a laboratory using conventional methods. The microorganisms may be matched or compared with human and plant pathogen databases to evaluate whether the microorganisms are acceptable for use in biotrickling filters.

In certain embodiments of the filtration apparatus, one or more methyl bromide degrading microorganisms are provided with the substrate component to provide at least one of the following criteria: tolerance to high methyl bromide concentrations; high biodegrading activity at low methyl bromide concentrations; constitutive expression of methyl bromide biodegradation, fast growth on inducing substrates; reduced pathogenicity; and low requirement for nutrients.

In one embodiment, the apparatus 10 can achieve a methyl bromide elimination capacity of approximately 240 $g/m^3_{reactor}$h. The methyl bromide can be removed from a volume of air at concentrations up to approximately 13 $g/m^3$. The efficiency of removal may be approximately 100% with the appropriate gas contact time with the microorganisms, and the methyl bromide concentration can be reduced to less than the detection limit of 0.4 $mg/m^3$ (0.1 ppm). High elimination efficiency can be obtained within approximately 40 days of inoculation.

In certain embodiments, it may be desirable, and occasionally necessary, to control the pH of the nutrient solution used to feed the microorganisms. In one embodiment, the pH of the nutrient solution is maintained above a value of about 5.8. Maintaining the pH in a slightly acidic to a basic range helps reduce inhibition of methyl bromide degradation. In addition, the rate of methyl bromide degradation may be influenced by the amount of sodium bromide that accumulates in the recycle liquid. For example, when the sodium bromide concentrations are about 48 g/L or more, the rate of degradation may be inhibited. Thus, the apparatus 10 may include a flow control device that adjusts the water or liquid feed rate to the apparatus 10. The apparatus 10 can provide superficial liquid velocities of about 2.55 to about 22 m/h without the recycle or trickling rate affecting the performance of the system. Efficient removal of the methyl bromide from the volume of gas may be obtained in temperature ranges from about 12 to about 40 degrees Celsius. In lower temperatures, efficiency may decrease. In situations where the apparatus 10 is used in quarantine methyl bromide fumigations, the filter volume may be about 4.3 $m^3$.

The system may be made using any conventional parts. For example, the tubing may be polyvinyl chloride (PVC) tubing. In addition, the various conduits may include one or more valves to control the flow of liquid or gas through the apparatus. In certain specific embodiments, the filtration apparatus may be similar to bioreactors or biotrickling filters for the biotreatment of methyl tert-butyl ether (MTBE) and tert-butanol (TBA) in groundwater, manufactured by Energy Resource Institute (Riverside, Calif.). The components of the apparatus 10 may be assembled using conventional techniques, as well.

Methyl bromide-degrading microorganisms, such as bacteria or fungi, may be applied to the substrate component 50 using any conventional method. For example, a substantially pure population or an isolated population of bacteria may be applied to the substrate component 50. Or, the substrate component 50 may be exposed to an established culture of one or more isolated strains of methyl bromide-degrading bacteria. As another example, methyl bromide-degrading bacteria may be provided on the substrate component by exposing the substrate component with a substance suspected of containing methyl bromide-degrading bacteria. Examples of substances include soil, activated sludge, compost extract, sewage and other sedimentations products. Preferably, the substances are naturally occurring. Thus, the culture of methyl bromide-degrading bacteria may be established in situ by seeding the apparatus 10 with the natural substances. An on-going supply of a low concentration (such as between about 0 and about 2.5 g/m$^3$) of methyl bromide may be supplied to the culture in the apparatus 10. Because the microorganisms depend on methyl bromide for survival, the microorganisms are able to multiply and survive in the system. Nutrients are applied to the culture, such as by passing a nutrient rich medium over the culture, to feed the cultures and maintain a desired amount of methyl bromide removal. However, as indicated above, substantially pure or isolated strains of bacteria may also be applied to the substrate component. These substantially pure or isolated strains may have been originally purified or isolated from the sedimentatious products and grown in culture before being applied to the substrate component. One benefit of using methyl bromide bacteria as disclosed herein relates to the fact that these bacteria are relatively slow growing. Accordingly, many embodiments of the filtration apparatus do not require an additional device or method for controlling biomass accumulation that may be associated with existing biotrickling filters.

In use, a filtration apparatus in accordance with the disclosure herein may be configured to effectively treat a plot size between about 0.3 to about 0.5 acres. However, additional embodiments may be configured to more effectively treat a plot having a size of about 225 m$^2$. The filtration apparatus may be coupled to one or more tarps, such as polyethylene tarps, used to trap methyl bromide during fumigation procedures, to form a methyl bromide collection/treatment system. For example, an apparatus may be welded, such as by hot welding, the apparatus to two polyethylene tarps. Methyl bromide may then be injected under the ground to fumigate the treatment site, as is conventionally practiced. The tarps may be placed over the treated ground, and air may be circulated in the interstice between the two tarps. The circulating air, containing methyl bromide, will pass through the filtration apparatus and be treated by the microorganisms of the substrate component. The filtered air may then be exhausted from the filtration apparatus.

Figure 5:
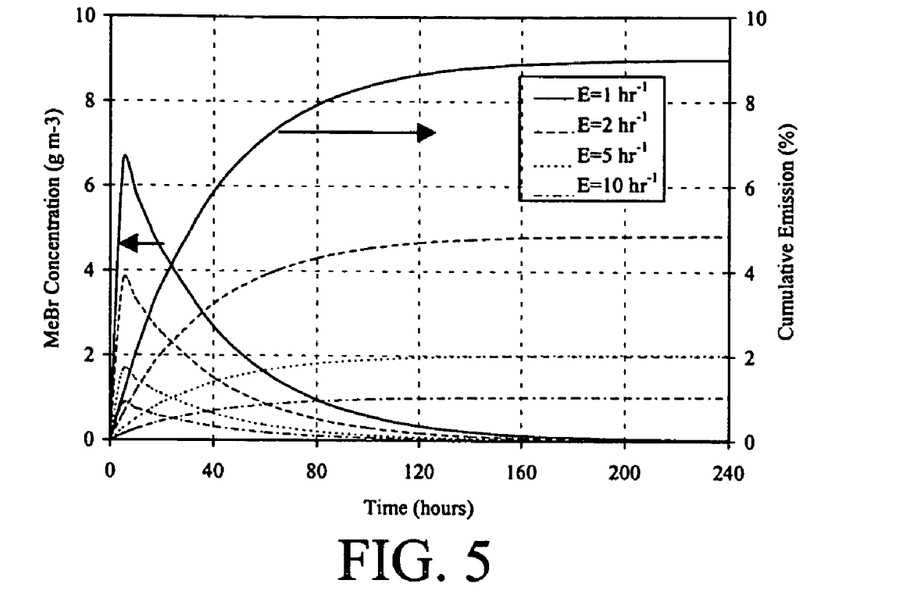
FIG. 5 is a graph showing the concentration of methyl bromide entering a potential treatment system over time and the cumulative percentage of applied methyl bromide lost to the atmosphere, as published in Chitwood and Deshusses (2001).

One example of a double tarp methyl bromide collection system has been described by (Chitwood and Deshusses, 2001, Development of a methyl bromide collection system for fumigated farmland. Environ. Sci. Technol. 35:636-642). In this system, air is continuously passed through the space between the two tarps, and methyl bromide diffusing from the soil though the first tarp is collected by the sweep air (e.g., the air between the two tarps). By maintaining a sufficient air exchange or air flow rate, diffusion of methyl bromide through the second tarp layer is minimized. Model simulations have demonstrated that the proposed technique is very effective in collecting methyl bromide emissions from field fumigations and it is estimated that methyl bromide escaping to the atmosphere can be reduced to less than 5% of the applied mass (Chitwood and Deshusses, 2001, supra; and see FIG. 5). Compared to quarantine fumigations, the two-tarp system for soil fumigations results in a relatively large air stream with a relatively low and constant methyl bromide concentration.

Thus, the biofiltration apparatus disclosed herein may be coupled to the double tarp system to effectively treat and remove the methyl bromide from the exhaust air contained in the tarp system.

In addition, the methyl bromide collection system, including the filtration apparatus, may be monitored as desired. For example, the system may be monitored over the entire treatment cycle to close mass balances (such as methyl bromide escape, collection, and removal). The production of carbon dioxide may be quantified and used in carbon closure. The mass of methyl bromide collected, treated, and emitted by the system may be computed. Bromide located in the liquid effluent may be quantified to match removal of methyl bromide and the production of bromide. The results may also be compared to mathematical model predictions, as desired.

EXAMPLES

Example 1

Methyl Bromide-Degrading Biotrickling Filter

A biotrickling filter was constructed as schematically represented in FIG. 2. The apparatus included three packed bed sections filled with lava rock, perlite or polyurethane as packing materials. Other equipment included an air supply, a methyl bromide supply, recycle liquid circulation, a nutrient supply (as a complete mineral medium), and a pH control by automatic addition of NaOH. The biotrickling filter was usually operated at standard conditions as specified in Table 1.

TABLE 1

| Standard operation of the biotrickling filter. | |
|---|---|
| Parameter | Value |
| Packing | |
| Total packed bed volume (3 sections) | 0.825 L |
| Gas flow | |
| Gas flow rate | 35 L/h |
| Empty bed gas residence time (EBRT) | 85 s |
| Methyl bromide concentration | Variable, as specified herein |
| Liquid recycling | |
| Recycle rate | 2.6 L/h |
| Superficial liquid velocity | 2.1 m/h |
| Recycle liquid volume in reactor base | 0.265 L |
| Medium feed | |
| Composition | Complex medium with all essential elements |
| Medium feed rate | 0.2 L/d |
| Liquid residence time | 1.8 d |
| pH control | |
| pH | 6.5-7.2 |
| NaOH | 0.125 M |

Example 2

Establishment of Methyl Bromide Degrading Mixed Cultures

Figure 6:
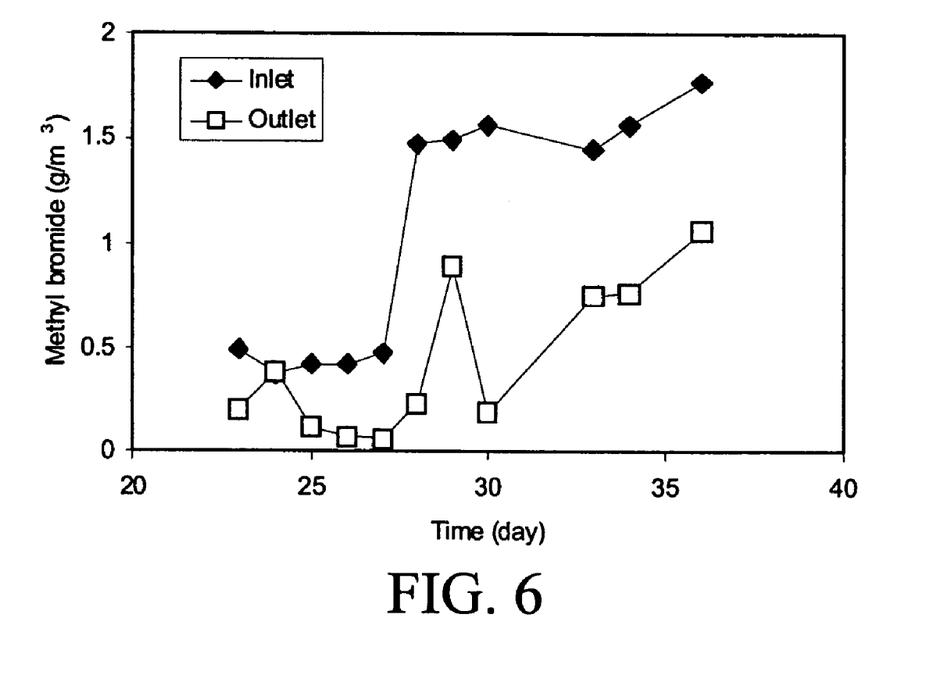
FIG. 6 is a graph of methyl bromide concentration versus time illustrating methyl bromide removal from a filtration apparatus, as disclosed herein.

Cultures of methyl bromide-degrading bacteria were obtained by inoculating or exposing the substrate component of the apparatus with a variety of natural sources or materials, such as soil and sediment. A continuous supply of a low concentration (about 0 to about 10 g/m³) of methyl bromide was supplied to the apparatus. The first signs of methyl bromide removal were observed after about 6-12 days of operation of the apparatus. Increased methyl bromide removal was observed after about 23 days of operation, as shown in FIG. 6. The methyl bromide elimination capacity seemed to reach a maximum value after about 35-40 days of operation. During operation, the pH in the recycle liquid declined, small amounts of bromide were produced in the recycle liquid, and the $CO_2$ concentration in the outlet air increased.

Example 3

Characterization of Methyl Bromide Degrading Bacteria

The influence of the pH, NaBr concentration, temperature, and methyl bromide concentration on methyl bromide biodegradation by the enrichment culture was evaluated.

The fate of methyl bromide in the biotrickling filter was determined by comparing the rate of methyl bromide removal with the rates of $CO_2$ production, bromide ion production and NaOH consumption as expected from the biodegradation reaction stoichiometry. Biodegradation of methyl bromide and pH control occur according to the following reactions $$2CH_3Br + 3O_2 \rightarrow 2HBr + 2\ CO_2 + 2H_2O \quad \text{Equation 3}$$

$$HBr + NaOH \rightarrow NaBr + H_2O \quad \text{Equation 4}$$

Figure 7:
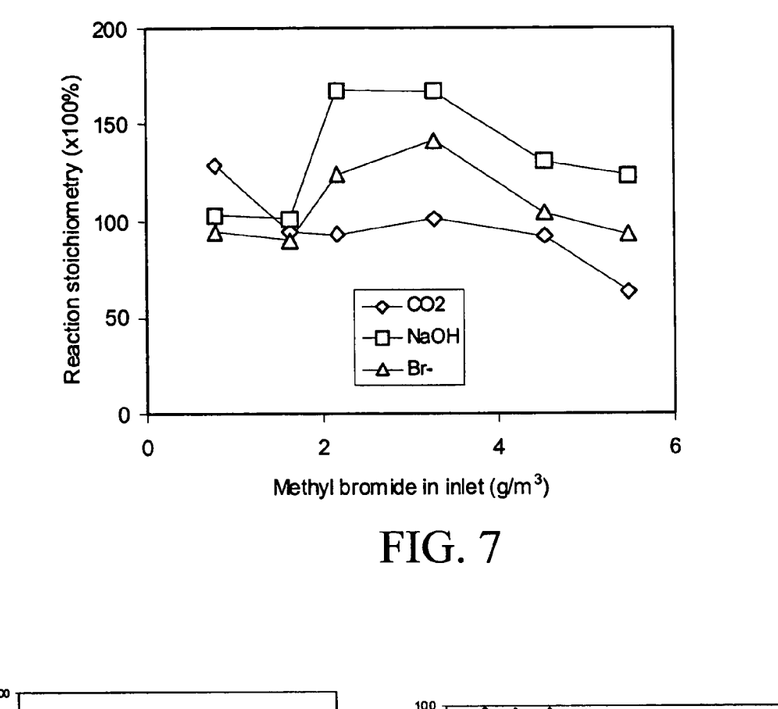
FIG. 7 is a graph of the observed reaction stoichiometry of methyl bromide removal a filtration apparatus.

Mass balances of methyl bromide removal in the biotrickling filter were determined over inlet concentrations of 0-5.5 g/m³ (FIG. 7). On a molar carbon basis, 95% of removed methyl bromide was recovered as $CO_2$. Bromide ion production accounted for on average 108% of the amount of methyl bromide removed, whereas NaOH consumption was 132% of the expected rate. No bromate was detected.

To further confirm that microbial degradation was the principal mechanism of methyl bromide removal in the biotrickling filter, one biotrickling filter was poisoned. As expected, the methyl bromide removal fell to zero, confirming that leakage, physical processes (e.g., absorption, diffusion) or chemical processes (e.g., hydrolysis) were orders of magnitude slower than the biodegradation.

The effect of the liquid recycle or trickling rate was examined at the lower and higher end of the range of recycle rates commonly employed in biotrickling filters. Methyl bromide removal was the same at a trickling rates of 2.55 and 22.2 L/h, corresponding to superficial liquid velocities of 2.0 and 17.7 m/h, respectively (Table 2). Hence, the trickling rate within this range does not appear to affect the performance. Standard operation of the biotrickling filter was at 2.1 m/h, which proved to be a rate high enough for maximum performance and without flooding even after 8 months of operation.

The gas flow direction had little effect on the performance (Table 2). Although the performance was slightly better with the gas flowing countercurrent with recycle liquid, the difference during cocurrent operation was minimal.

Figure 8:
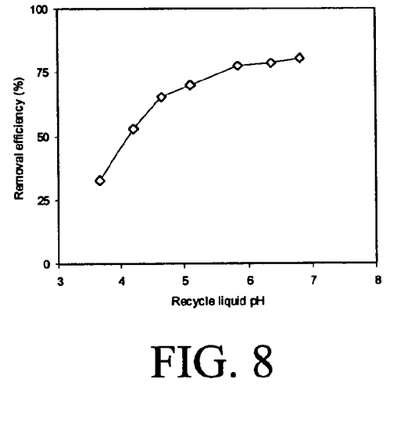
FIG. 8 is a graph of methyl bromide removal efficiency as a function of recycle liquid pH.

FIG. 8 demonstrates that pH control is important for effective treatment. Inhibition of methyl bromide biodegradation was observed at a pH of 5.5-5.8 and lower. Standard operation of the biotrickling filter was at an average pH of 7.0.

Figure 9:
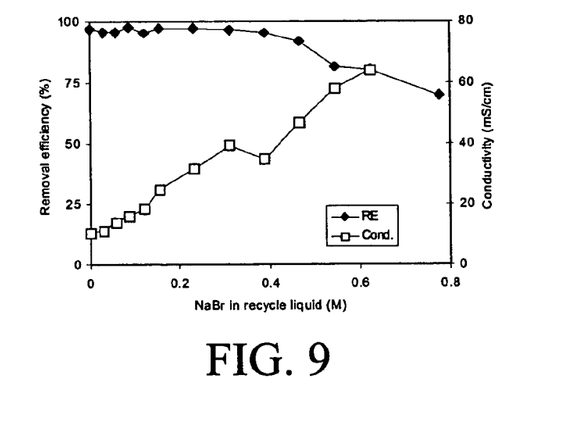
FIG. 9 is a graph of methyl bromide removal efficiency as a function of NaBr concentration in the recycle liquid.

FIG. 9 illustrates the effect of the NaBr concentration in the recycle liquid. Inhibition of methyl bromide removal was observed at NaBr concentrations of 0.47 M (48 g/L) and higher. The NaBr concentration in the recycle liquid depends on the methyl bromide load and removal rate in the biotrickling filter and the liquid purge rate or liquid residence time in the biotrickling filter. In this filtration apparatus, measured NaBr concentrations were always well below the limit of 0.47 M.

The biotrickling filter was operated at Californian ambient temperatures. During the summer, with temperatures fluctuating between 20-40° C., the temperature had no noticeable effect on the performance. A slight reduction in methyl bromide removal was observed during the winter months when temperatures dropped below 12° C.

TABLE 2

Influence of the trickling rate, expressed as the superficial liquid velocity, and the gas flow direction on biotrickling filter performance (EBRT = 94 s). Note that the experiment was performed on purpose at removal lower than 99% in order to observe any positive or negative effect of the parameters being investigated.

| | | Superficial liquid velocity (m/h) | |
| --- | --- | --- | --- |
| Parameter | Unit | 2.0 (standard operation) | 17.7 |
| Inlet concentration | (g/m³) | 2.927 | 2.927 |
| Outlet concentration | (g/m³) | 0.312 | 0.249 |
| Removal efficiency | (%) | 89 | 91 |
| Elimination capacity | (g/m³ · h) | 99.8 | 102.3 |

| | | Gas flow direction | |
| --- | --- | --- | --- |
| | | Countercurrent (standard operation) | Cocurrent |
| Inlet concentration | (g/m³) | 3.713 | 3.042 |
| Outlet concentration | (g/m³) | 1.130 | 1.122 |
| Removal efficiency | (%) | 70 | 63 |
| Elimination capacity | (g/m³ · h) | 98.6 | 73.3 |

Six substantially pure cultures of bacterial were isolated and purified on agarose mineral medium plates. The cultures were supplied with methyl bromide as the sole carbon and energy source. The plates were amended with bromophenol blue to allow distinguishing of the cultures. Two of the six isolates were further identified using conventional PCR methods (e.g., amplification of the V3-V6 region or of the 16S rDNA). The two isolates were sent to Microbial Insights (Rockford, Tenn.) for characterization.

The two isolated populations of bacteria had nucleic acid sequences that were substantially homogenous to existing bacteria. One of the two isolates appeared to be affiliated with comamonoadaceae bacteria. This isolate shared about a 98% homogeny with *Variovorax* sp. For example, the isolated bacteria had a nucleic acid sequence that was about 98% homogenous to GenBank Accession Numbers AB098595, AJ292636, or AJ292633. The second isolate appeared to be affiliated with actinobacteria. For example, the isolated bacteria had a nucleic acid sequence that was about 98% homogenous to the sequences accorded GenBank Accession Numbers AF498726, AF498736, or AF498723.

Thus, the present filtration apparatus may comprise one or more different strains of methyl bromide degrading bacteria.

Example 5

Determination of Steady-State Performance

Figure 10:
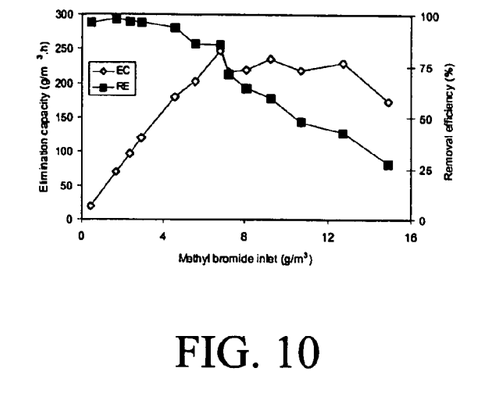
FIG. 10 is a graph of methyl bromide elimination capacity as a function of inlet concentration.

The maximum elimination capacity of methyl bromide in the biotrickling filter was determined by stepwise increasing the methyl bromide concentration. A typical elimination capacity curve is shown in FIG. 10. Depending on the inlet concentration, the following phases can be distinguished:

At low concentrations increasing up to 3 $g/m^3$, the removal efficiency was consistently greater than 96%. This is a first order regime, where the elimination capacity increases proportionally with the concentration or load.

At concentrations between 3 and 6.8 $g/m^3$, significant breakthrough of methyl bromide occurred. In this intermediate concentration range, the elimination capacity increases with the concentration or load, but the trend is no longer linear.

When the concentration reached 6.8 $g/m^3$ a maximum elimination capacity of 240 $g/m^3$.h was observed. Further increase in concentration did not result in increases in performance. This delimited the zero order regime.

At concentrations greater than 13 $g/m^3$ (3300 ppm) a reduction of the elimination capacity was observed. One possible explanation would be a toxic effect of methyl bromide at high concentrations causing a reduction of the biodegradation rate.

A methyl bromide elimination capacity of 240 $g/m^3$ corresponds to a removal rate of 30 g carbon/$m^3$.h. This is a rate comparable to removal rates in biotrickling filters of moderately biodegradable pollutants such as toluene (typically 30-70 g toluene/$m^3$.h, or 27-64 g carbon/$m^3$.h), but less than those observed for easily biodegradable pollutants such as ethanol (up to 250 g ethanol/$m^3$.h, or 130 g carbon/$m^3$.h). An important outcome is the toxicity of methyl bromide at concentrations of 13 $g/m^3$ and higher. Because expected concentrations from fumigation chambers are well above this level, treatment in biotrickling filters may first require preconditioning of the air stream to reduce the concentration below levels that are toxic for microorganisms. Thus, in these or similar situations, a load dampening device may be coupled to the filtration apparatus, as discussed herein.

Elimination capacities in individual sections of the biotrickling filter are shown in FIG. 11. No significant differences were observed in the performance of each packing, although their characteristics differ widely.

Figure 12:
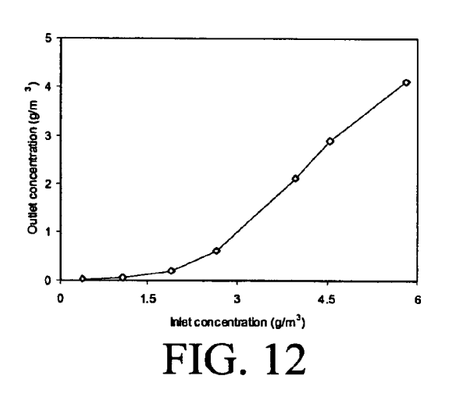
FIG. 12 is a graph of methyl bromide outlet concentration as a function of the inlet concentration.

Another important parameter is the gas residence time (EBRT) in the biotrickling filter (volume of reactor divided by the gas flow rate). A series of experiments was conducted with EBRT in the range of 23-127 s. A typical example is presented in FIG. 12 for an EBRT of 50 s. At inlet concentrations greater than ~2.5 $g/m^3$, there was a linear relationship between the inlet and outlet concentration. At lower inlet concentrations, the outlet concentration decreased less than proportionally. This indicates that at low inlet concentration a limitation of performance occurs, which might be attributed to mass transfer limitation or to a biological limitation. Nevertheless, the results in FIG. 12 also demonstrate that biotrickling filtration can reduce methyl bromide concentrations down to non-detectable level (0.1 ppm for example).

Figure 13:
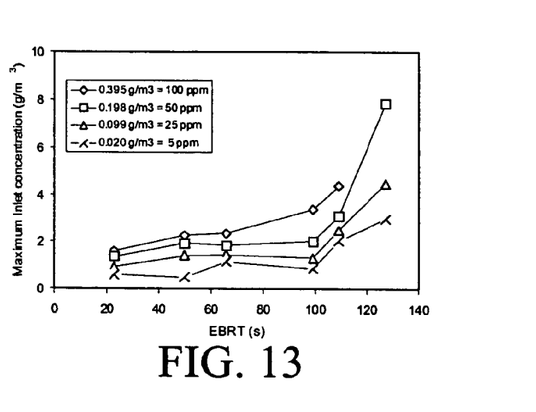
FIG. 13 is a graph of the maximum inlet concentration as a function of the EBRT illustrating the influence of the EBRT on the maximum inlet concentration for removal of methyl bromide down to concentrations of 5-100 parts per million.
Figure 14:
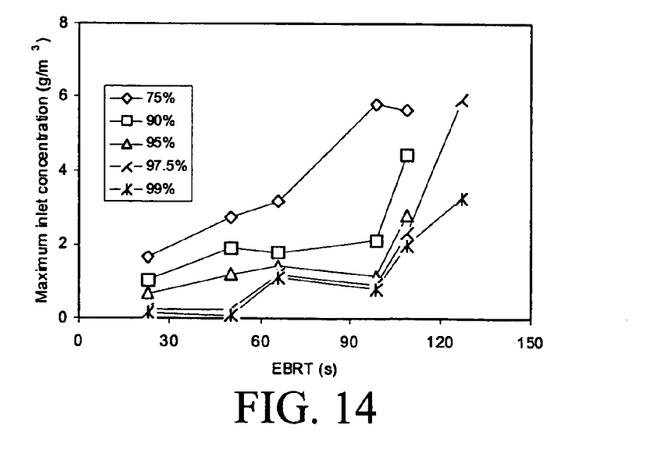
FIG. 14 is a graph of the maximum inlet concentration as a function of EBRT illustrating the influence of the EBRT on the maximum inlet concentration for overall methyl bromide removal of 75-99%.

Biotrickling filter design generally considers reduction of the concentration to a certain threshold concentration, or at a certain overall mass reduction of the pollutant. Maximum inlet concentrations were determined that would allow for removal of methyl bromide down to a concentration in the range of 5-100 ppm (0.02-0.40 $g/m^3$), and for overall mass reduction in the range of 75-99%. The results are presented in FIG. 13 and FIG. 14, respectively. In either scenario a long empty bed residence time (EBRT) allows for a higher inlet concentration to be treated while allowing meeting higher treatment objectives. The data in FIGS. 13 and 14 can be used or scaling up the biotrickling filter for application at fumigation sites.

Example 6

Determination of Transient Performance

A series of experiments were performed to determine the performance after a major increase of the inlet concentration as well as after various system upsets. These experiments provide information on the flexibility of the biotrickling filter with respect to changing conditions and the ability to recover from non-standard operation.

Figure 15:
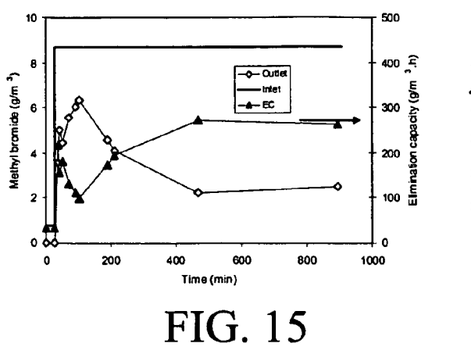
FIG. 15 is a graph of methyl bromide concentration versus time illustrating the response of a filtration apparatus to a sudden increase in methyl bromide concentration.

FIG. 15 demonstrates the response of the biotrickling filter to an increase of the inlet concentration from 0.75 to 8.67 $g/m^3$. The elimination capacity initially increased to very high values because of methyl bromide absorption in the recycle liquid. This transient state was followed by a decrease to a minimum of 100 $g/m^3$.h approximately 100 min after the step increase, whereas steady state removal at the maximum elimination capacity occurred after about 5 hours. These results indicate that a rapid increase of the inlet concentration may result in a temporary, partial loss of performance.

Figure 16:
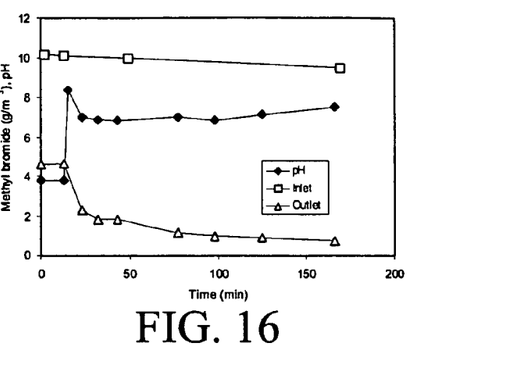
FIG. 16 is a graph of methyl bromide concentration versus time illustrating the recovery of methyl bromide removal after restoring a neutral pH at 13 minutes.
Figure 17:
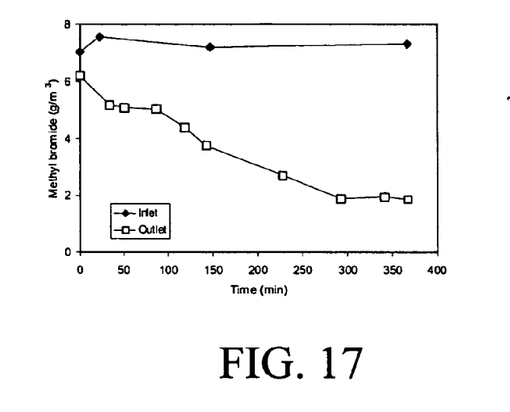
FIG. 17 is a graph of methyl bromide concentration versus time illustrating the recovery of methyl bromide removal after resuming liquid recycling at 0 minutes.
Figure 18:
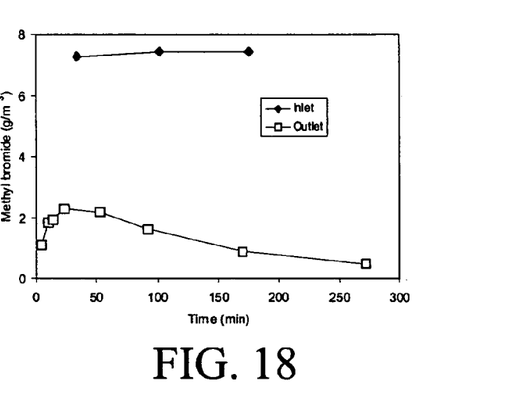
FIG. 18 is a graph of methyl bromide concentration versus time illustrating recover of methyl bromide removal after one day of operation of the apparatus without methyl bromide in an air stream. Methyl bromide supply was resumed at a time of 0 minutes.

As indicated herein, low pH inhibits methyl bromide biodegradation. However, a fast recovery of methyl bromide elimination was observed once the pH in the recycle liquid was restored to a substantially neutral value (FIG. 16). This indicates that pH control is important to maintain full capacity of the biotrickling filter, but short-term failure of pH control does not cause irreversible damage to the system. A shut-down of liquid recycling seriously affected performance. This was expected since the pH in the biofilm will rapidly decrease in absence of trickling, and biodegradation of methyl bromide will be inhibited. Removal dropped to a very low level after interrupting the liquid recycle for 19 hours, but effective methyl bromide treatment was fully restored 5 hours after resuming normal operation (FIG. 17). Finally, a 1-day interruption of the methyl bromide supply to the biotrickling filter (i.e., supply of clean air) had little effect on the performance. Once methyl bromide was again present in the air stream, removal started almost immediately (FIG. 18).

Overall, the results of this example demonstrate that the biotrickling filter is a robust system capable of fast recovery after a change of conditions or a system upset. Although temporary reduction of the elimination capacity were observed in some cases, these only have a minor impact on the cumulative removal over long periods of time.

Example 7

Characteristics of Certain Biofiltration Apparatus

Although the biofiltration apparatus has been described herein in detail to enable one of ordinary skill in the art to make and use the invention, certain filtration apparatus may include one or more of the following characteristics. The chamber volume, or interior compartment volume, may have a volume of 80 m$^3$. The cycle time for a treatment procedure may be about 12 hours, or two fumigations per day. On average, the cycle may include an 8 hour exposure period, a 1-2 hour ventilation period, and a 2-3 hour loading/unloading period. The amount of methyl bromide that may be removed may be about 5.13 kg/cycle, which is the average methyl bromide dose for a fumigation volume of about 80 m$^3$. The apparatus can be operated throughout a year. The apparatus can accommodate an airflow rate of approximately 560 m$^3$/h. The elimination capacity may be about 100 g/m$^3$.h. Since this value is below the maximum elimination capacity of 240 g/m$^3$.h, it can be expected that nearly all of the methyl bromide in the volume of gas can be removed. An average methyl bromide inlet concentration may be about 0.76 g/m$^3$. The filter size may be about 4.3 m$^3$, which corresponds to an EBRT of 28 seconds. The expected removal efficiency may be about 95% or greater (see FIG. 14).

For a fumigation site, methyl bromide may be applied to the soil in an amount of about 300 kg/hectare. The methyl bromide emissions may be captured using the two-layer tarp system, discussed herein. With an air exchange rate of about 2 volumes/hour, this system captures about 95% of the methyl bromide emitted, and generates an air flow rate of about 6800 m$^3$/hour. A cycle time may be about 10 days. Every 10 days, the filtration apparatus may be moved and is operated year-round so that it serves about 36 fumigations. A load dampening system may be used to provide a substantially constant air flow and substantially constant methyl bromide concentration. The elimination capacity of the filtration apparatus is about 100 g/m$^3$.h. Nearly complete removal of methyl bromide may be obtained. The filtration apparatus for this embodiment may have a size of about 34 m$^3$. This system can be housed and moved on a conventional 40 foot trailer container.

Example 8

Load Dampening System

As discussed herein, fluctuating methyl bromide concentrations in fumigation procedures present a challenge for effective use of a biotrickling filter. Thus, the present filtration apparatus has been designed to optionally include a load dampener which is effective in equalizing the load of methyl bromide over time. The main function of the load dampener is to adsorb methyl bromide from the air stream when the methyl bromide concentration is high, and release it when the concentration of methyl bromide is low. The load dampener is placed upstream of the biotrickling filter.

Load dampeners were constructed with granular activated carbon (e.g., low activity carbon (~35% activity) and high activity carbon (~95% activity). The granular activated carbon was obtained from California Carbon (Wilmington, Calif.).

The load dampeners effectively curtailed release of methyl bromide for prolonged periods of time. For example, experiments performed with load dampeners using either low activity carbon or high activity carbon resulted in relatively long release times of methyl bromide. This long release time is desirable since the use of the granular activated carbon is to flatten incoming peaks of methyl bromide. The desorption of methyl bromide was greater than 90% effective, and thus, adsorption of methyl bromide is reversible in the present load dampening systems. The load dampeners were effective in dampening methyl bromide emissions while maintaining relatively constant temperatures, for example, by maintaining the temperature within about 4° C.

The load dampeners were effective in dampening methyl bromide even at concentrations of methyl bromide of about 40-60 g/m$^3$ (e.g., the peak concentration of methyl bromide in commodity fumigation exhausts). The methyl bromide output from the present load dampeners remained substantially constant even with varying methyl bromide feed concentrations. Thus, the present load dampeners can effectively maintain a desired methyl bromide inflow rate into the biotrickling filter.

Example 9

Mobile Methyl-Bromide Filtration Apparatus

A mobile methyl-bromide filtration apparatus was constructed to treat two loads of five pounds of methyl bromide per day. The apparatus was built on a trailer so that the apparatus could be effectively moved from one treatment site to another. The total volume of the load dampening vessel was about 1.25 m$^3$. The total mobile reactor bed volume was about 4.5 m$^3$. The apparatus was constructed to treat about 60 g/m$^3$ of methyl bromide. The air flow through the carbon absorber bed was about 850 m$^3$/hr (500 cfm) and the air flow through the mobile bioreactor bed was about the same. The superficial velocity of the carbon absorber bed was about 12.1 m/min, and the superficial velocity of the mobile bioreactor bed was about 5.4 m/min. The amount of coconut shell activated carbon was about 450 kg (4×8 mm mesh). The PERLITE packing material or substrate of the bioreactor was 5 to 15 mm, and irregularly shaped (4.3 m$^3$). The gas contact time in the biotrickling filter was about 18.2 seconds. The sump volume was 0.4 m$^3$, the trickling rate was 1.36 m/hour, make-up water was provided to compensate for evaporation, and the mineral nutrient feed rate was 0.06 m$^3$/day. The pH was monitored and controlled to maintain a pH of about 7. The water lever was monitored and controlled by adding make-up water as necessary. The temperature was monitored and controlled on-line using a thermocouple device. The MeBr concentration was monitored and controlled on-line using an electrochemical sensor before the load dampener, between the load dampener and the biotrickling filter, and after the biotrickling filter.

Figure 20:
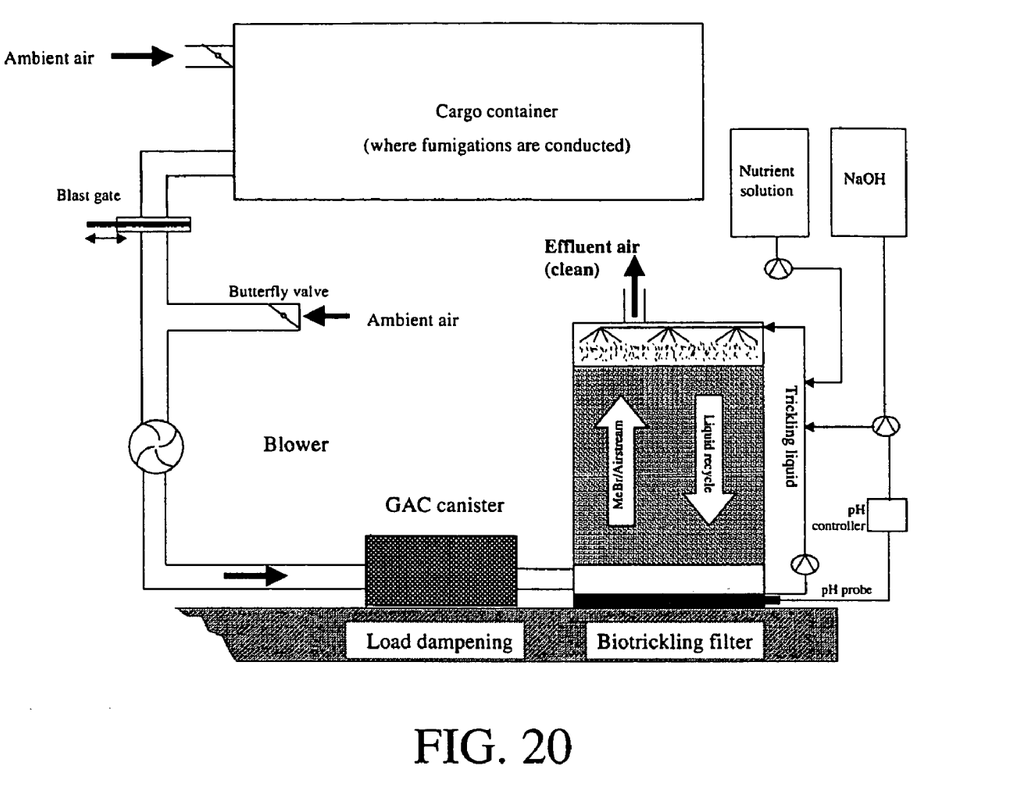
FIG. 20 is a schematic illustration of a mobile methyl bromide filtration apparatus.

A schematic of the mobile filtration apparatus is at FIG. 20. The apparatus or components of the apparatus can be operated manually or automatically.

While this invention has been described with respect to various specific examples and embodiments, it is to be understood that the invention is not limited thereto and that it can be variously practiced with the scope of the following claims. Multiple variations and modifications to the disclosed embodiments will occur, to the extent not mutually exclusive, to those skilled in the art upon consideration of the foregoing description. Additionally, other combinations, omissions, substitutions and modifications will be apparent to the skilled artisan in view of the disclosure herein. Accordingly, the present invention is not intended to be limited by the disclosed embodiments, but is to be defined by reference to the appended claims.

A number of references have been identified herein. Each of these references is hereby incorporated by reference in its entirety.

What is claimed is:

1. A filtration apparatus for filtering methyl bromide from a volume of methyl bromide-containing gas, comprising:
   a housing having a first end, a second end, and a sidewall extending from the first end to the second end to define an interior compartment;
   a contaminated gas inlet located on the housing to direct methyl bromide-containing gas into the interior compartment;
   a filtered gas outlet located on the housing to direct filtered gas out from the interior compartment;
   and a substrate component comprised of an inert material located in the interior compartment, the substrate component having located therein a population of methyl bromide-degrading microorganisms effective in degrading methyl bromide present in a volume of gas passed from the contaminated gas inlet into the interior compartment,
   and a biotrickling filter, including a nutrient dispersion device, sufficient to disperse nutrients through the substrate component and continuously purge the substrate of bromine ions.

2. The apparatus of claim 1, wherein the contaminated gas inlet and the filtered gas outlet are located on opposite ends of the substrate component.

3. The apparatus of claim 1, wherein the substrate component is substantially a non-liquid material.

4. The apparatus of claim 1, wherein the substrate component includes a plurality of fluid flow paths to permit the methyl bromide-contaminated gas to flow through the substrate.

5. The apparatus of claim 1, wherein the methyl bromide-degrading microorganisms are bacteria.

6. The apparatus of claim 1, wherein the substrate component comprises at least one distinct substrate section, each substrate section having a population of methyl bromide degrading microorganisms located on a substrate material.

7. The apparatus of claim 1, further comprising a microbe nutrient inlet located on the housing.

8. The apparatus of claim 1, further comprising a nutrient reservoir component located in the housing.

9. The apparatus of claim 1, further comprising a controller device coupled to the apparatus to control the flow of contaminated gas through the apparatus.

10. The apparatus of claim 1, further comprising a contaminated gas load dampening device coupled to the apparatus to reduce surges in contaminated gas entering the housing.

11. The apparatus of claim 10, wherein the contaminated gas load dampening device includes granular activated carbon.

12. The apparatus of claim 10, wherein the contaminated gas load dampening device includes a liquid phase.

13. The apparatus of claim 12, wherein the liquid phase includes an organic or mineral liquid.

14. The apparatus of claim 1, further comprising a controller coupled to the apparatus to control the pH of nutrient fluid passed over the methyl bromide degrading microorganisms.

15. The apparatus of claim 1 located on a mobile base.

16. A method of filtering methyl bromide from a volume of gas, comprising:
   providing a biotrickling biofiltration apparatus having a population of methyl bromide-degrading microorganisms supported by a substrate component, said substrate component being comprised of an inert material and being located in a housing;
   directing contaminated gas containing methyl bromide into the housing via a contaminated gas inlet to expose the methyl bromide-degrading microorganisms to the gas to degrade the methyl bromide and form a filtered gas; and
   directing the filtered gas from the housing through a filtered gas outlet.

17. The method of claim 16, further comprising at least one of
   providing a nutrient liquid to the microorganisms,
   recycling the liquid in the filtration apparatus, and
   controlling the conditions of the liquid to effectively control the growth and activity of the microorganisms.

18. The method of claim 16, further comprising directing the contaminated gas through a methyl bromide concentration dampening device prior to directing the contaminated gas into the housing.

19. An isolated population of methyl bromide degrading microorganisms produced by a process comprising
   providing a contained environment having a substrate component comprised of an inert material structured to permit bacteria to grow thereon;
   placing a naturally occurring sedimentatious material, such as soil, sewage, sediment, and the like, suspected of containing methyl bromide-degrading bacteria in the contained environment; and
   exposing the contained environment to a substantially continuous supply of gas containing a concentration of methyl bromide ranging from about 0 $g/m^3$ to about 2.5 $g/m^3$.

* * * * *